UNITED STATES PATENT OFFICE.

CHARLES M. HALL, OF NIAGARA FALLS, NEW YORK, ASSIGNOR TO ALUMINUM COMPANY OF AMERICA, OF NEW KENSINGTON, PENNSYLVANIA, A CORPORATION OF PENNSYLVANIA.

PROCESS OF MAKING ALUMINA.

No. 921,609.  Specification of Letters Patent.  Patented May 11, 1909.

Application filed January 11, 1906. Serial No. 295,652.

*To all whom it may concern:*

Be it known that I, CHARLES M. HALL, of Niagara Falls, county of Niagara, and State of New York, have invented a Process of Making Alumina, of which the following is a specification.

In the manufacture of alumina as heretofore most commonly practiced, bauxite has been heated in a digester with caustic soda, and sometimes with carbonate of soda and lime, thus producing sodium aluminate which is treated with carbonic dioxid, whereby the alumina is precipitated, and the soda converted into a soluble carbonate. This process involves the use of a large amount of soda, and a considerable proportion of this material is lost because it is rendered insoluble by combination with the silica in the bauxite.

My present invention cheapens the manufacture very greatly, and by avoiding the introduction of silica in solution and mechanical impurities it produces a much purer product, better suited for the manufacture of aluminum than has heretofore been made.

I have discovered that if bauxite be intimately mixed with calcium chlorid, and heated in an atmosphere containing oxygen or steam, the calcium chlorid will be decomposed forming chlorin (if an atmosphere containing oxygen is used) or hydrochloric acid (if steam is used), and an oxid of calcium, which oxid will unite with the alumina and silica of the bauxite, to form an aluminate and silicate of calcium. If this product be digested with a solution of carbonate of soda (to which some caustic soda may be added, if desired) enough carbonate of soda being used to supply about sixty-two parts of $Na_2O$ to every one hundred and two parts of $Al_2O_3$ (with preferably some excess of the carbonate of soda), the aluminate of calcium will be decomposed, forming soluble aluminate of soda and an insoluble carbonate of calcium. The alumina can then be extracted by known methods, preferably by the use of carbon dioxid.

In practicing my invention I prefer to use bauxite as low as possible in silica, for the reason that a high silica bauxite produces to some extent an insoluble alumino-calcium silicate which is not decomposed by the after treatment with carbonate of soda and which involves a loss, as it renders a portion of the alumina insoluble. I mix the bauxite with the chlorid of the alkaline earth metal, preferably calcium chlorid, preferably in the proportions of about 110 parts of calcium chlorid to 102 parts of alumina, and 110 parts of calcium chlorid to 60 parts of the contained silica in the bauxite. The mixture is preferably made in the form of a wet mud, so as to bring the compounds into intimate contact. It is then heated at a low temperature, and is preferably briqueted so as to render it easy to treat with the steam. The heating of the mixture and its treatment with steam or air may be carried out with any convenient form of apparatus, but I prefer to use a furnace constructed preferably like a lime kiln having a charging-opening at the top and a grate or other means at the base for withdrawing the treated product, and having near the base gas inlets and air inlets. The steam may be introduced separately, or with the air or gas, or gas may be employed which will itself yield sufficient steam of itself to effect the reaction. In order to obtain the best results, I may preheat the air and gas before introducing them into the furnace, and I pass the flame and heated gases through the charge in such manner as to obtain the proper temperature, which is a bright red heat. The gases from the furnace are preferably drawn off by a suitable induction apparatus, and are passed through cooling apparatus and scrubbers, which will extract the hydrochloric acid, care being taken to use as little water as possible, so as to prevent unnecessary dilution of the acid. The mixture when withdrawn from the furnace will contain aluminate of calcium and silicate of calcium or alumino-silicate of calcium, and when withdrawn the mixture is heated or digested with a solution of carbonate of soda, either with or without pressure, so as to decompose the calcium aluminate and to form soluble aluminate of soda and insoluble carbonate of calcium.

Among the advantages of my invention are that with the use of calcium chlorid which heretofore has been regarded as a waste and valueless product, I am enabled to free bauxite from its impurities, and also as a valuable by-product to obtain hydrochloric acid or chlorin. Moreover the alumina which it yields is very pure, for all the silica of the bauxite will combine with the lime as an insoluble compound and is therefore easily separated. Furthermore, the calcium aluminate which is produced by the heating of the bauxite as above described, when treated with soda yields a solid product which filters out very easily and this prevents the introduction of mechanical impurities into the solution of aluminate of soda which would contaminate the alumina with both silica and titanic acid. Titanic acid yields titanium in the aluminum finally produced from the alumina, and is for some purposes a very objectionable impurity. My invention also effects an important saving of carbonate of soda. In processes heretofore used much of the soda is rendered insoluble by combination with the silica in the bauxite and is therefore lost, but the calcium silicate or alumino-calcium silicate which is formed in my process is very insoluble and inert and can not react with the soda in the subsequent treatment.

Instead of using calcium chlorid alone in the admixture with bauxite, I may employ calcium chlorid and common salt. When common salt is added to the calcium chlorid, I prefer to employ them in the proportion of about 75 per cent. of calcium chlorid and 25 per cent. of common salt, and so as to contain as much chlorin as though calcium chlorid alone were used. The common salt is also decomposed by steam in the presence of bauxite, (though with greater difficulty than calcium chlorid) and will thus afford means for obtaining carbonate of soda as an additional by-product of the process. The greater difficulty of decomposing common salt, will require a somewhat higher temperature to be used when it is employed, than when calcium chlorid alone is employed.

Instead of an atmosphere containing steam for heating the mixture above described, I may employ an atmosphere containing some free oxygen, using a fuel gas which will give very little steam, such, for example, as fuel gas made from anthracite coal or coke with air alone. In this modification of my process chlorin is produced in the gases and may be collected and utilized in the manufacture of bleaching powder. And by the term "atmosphere containing oxygen", I include and intend to cover an atmosphere containing oxygen either free or combined in the form of water vapor.

My process may be modified in many other ways by those skilled in the art, since

What I claim is:

1. An improvement in the manufacture of alumina, which consists in the step of producing an aluminate of calcium by heating bauxite in an atmosphere containing oxygen in admixture with chlorid of calcium, substantially as described.

2. An improvement in the manufacture of alumina, which consists in the step of heating a mixture of bauxite and calcium chlorid in the presence of steam, substantially as described.

3. An improvement in the manufacture of alumina, which consists in producing an aluminate of calcium by heating bauxite in an atmosphere containing oxygen in admixture with chlorid of calcium, and then separating the alumina from the aluminate, substantially as described.

4. An improvement in the manufacture of alumina, which consists in the step of producing an aluminate of calcium by heating bauxite in an atmosphere containing oxygen in admixture with chlorid of calcium, the calcium chlorid being present in proper proportions to satisfy the alumina and silica of the bauxite and to produce an insoluble silicate or alumina-silicate, substantially as described.

5. An improvement in the manufacture of alumina, which consists in the step of producing aluminate of calcium by heating bauxite in an atmosphere containing oxygen in admixture with chlorid of calcium and common salt, substantially as described.

6. An improvement in the manufacture of alumina, which consists in the step of producing an aluminate of calcium by heating bauxite in an atmosphere containing oxygen in admixture with the chlorid of calcium, and recovering the by-product so produced, substantially as described.

7. The improvement in the manufacture of alumina, which consists in heating a mixture of bauxite and chlorid of calcium in an atmosphere containing oxygen and digesting the resultant product with a solution of carbonate of soda to form aluminate of soda, and then recovering the alumina therefrom, substantially as described.

In testimony whereof, I have hereunto set my hand, January 10, 1906.

CHARLES M. HALL.

Witnesses:
THOMAS W. BAKEWELL,
ANNA E. WALLACE.